US009600948B2

(12) United States Patent
Miyazawa

(10) Patent No.: US 9,600,948 B2
(45) Date of Patent: Mar. 21, 2017

(54) KEYLESS ENTRY APPARATUS

(71) Applicant: Alps Electric Co., Ltd., Tokyo (JP)

(72) Inventor: Akira Miyazawa, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/997,088

(22) Filed: Jan. 15, 2016

(65) Prior Publication Data

US 2016/0292941 A1 Oct. 6, 2016

(30) Foreign Application Priority Data

Mar. 30, 2015 (JP) ................................ 2015-068679

(51) Int. Cl.
*H04B 10/85* (2013.01)
*G07C 9/00* (2006.01)

(52) U.S. Cl.
CPC ..... *G07C 9/00309* (2013.01); *G07C 9/00126* (2013.01); *G07C 2009/00555* (2013.01); *G07C 2009/00769* (2013.01); *G07C 2009/00793* (2013.01); *G07C 2209/06* (2013.01); *G07C 2209/61* (2013.01); *G07C 2209/63* (2013.01)

(58) Field of Classification Search
CPC ........... G06K 19/0701; G06K 19/0723; G06K 7/0008; G07C 2009/00333; G07C 9/00309; G07C 2009/00793; G07C 2209/63; G07C 9/00182; G07C 2009/00222; G07C 2209/61; G07C 9/00007; G07C 2009/00769; G07C 9/00126; G07C 2209/06; B60C 23/0433; B60C 23/0444; B60C 23/0416; B60R 25/24; G07B 15/063; H03C 7/027; B60L 2210/14
See application file for complete search history.

(56) References Cited

U.S. PATENT DOCUMENTS

| | | | | | |
|---|---|---|---|---|---|
| 5,193,222 | A * | 3/1993 | Sasaki | H04L 27/2071 | 455/102 |
| 5,751,765 | A * | 5/1998 | Matsubara | G06K 7/0008 | 235/380 |
| 2008/0064345 | A1* | 3/2008 | Yoshida | G07C 9/00309 | 455/127.1 |
| 2013/0236007 | A1* | 9/2013 | Munro | H04L 9/0861 | 380/44 |
| 2016/0156419 | A1* | 6/2016 | Druml | H04B 10/85 | 398/40 |

FOREIGN PATENT DOCUMENTS

JP 2010-185186 8/2010

* cited by examiner

*Primary Examiner* — Dionne H Pendleton
(74) *Attorney, Agent, or Firm* — Brinks Gilson & Lione

(57) ABSTRACT

A keyless entry apparatus includes: a vehicle-side device provided in a vehicle, the device including a vehicle-side transmitter that transmits a request signal and a vehicle-side receiver that receives an answer signal; and a mobile device including a mobile device receiver that receives the request signal and a mobile device transmitter that transmits the answer signal in accordance with the request signal. The vehicle-side device includes at least one modulator that modulates the request signal, the mobile device includes at least one demodulator that demodulates the request signal in accordance with the corresponding at least one modulator, and the request signal includes a signal modulated by the at least one modulator. Switching between modulation methods for the request signal is performed at at least one timing.

5 Claims, 3 Drawing Sheets

KEYLESS ENTRY APPARATUS

CLAIM OF PRIORITY

This application claims benefit of priority to Japanese Patent Application No. 2015-068679 filed on Mar. 30, 2015, which is hereby incorporated by reference in its entirety.

BACKGROUND

1. Field of the Disclosure

The present disclosure relates to a keyless entry apparatus that performs predetermined control such as locking/unlocking of the door of a vehicle through mutual communication between a vehicle-side device and a mobile device.

2. Description of the Related Art

In the keyless entry apparatus disclosed in Japanese Unexamined Patent Application Publication No. 2010-185186, a vehicle-side device transmits a request signal having a strength variation to a mobile device. The mobile device, which detects whether or not the request signal has a strength variation, does not send an answer signal when the request signal has no strength variations and sends an answer signal when the request signal has a strength variation. As a result, the simple configuration allows a relay attack to be detected.

Note that a relay attack is performed by a first unauthorized relay device arranged near a vehicle and a second unauthorized relay device which is arranged at a location spaced apart from the vehicle and performs wireless communication with the first relay device. In other words, in the vicinity of the vehicle, a request signal formed of an LF signal transmitted from the vehicle-side device is relayed by the first relay device and the second relay device, and the signal is transmitted from the second relay device. When a person having a mobile device approaches the second relay device, the mobile device will receive a signal relayed by the second relay device. Here, when the mobile device transmits an answer signal formed of an RF signal in accordance with the receipt of the signal relayed by the two relay devices, the vehicle will perform an unlocking operation at a location that is not intended by a user in a state in which the user is spaced apart from the vehicle.

In the keyless entry apparatus disclosed in Japanese Unexamined Patent Application Publication No. 2010-185186, a strength variation is added to a request signal and it is determined whether or not an answer signal is allowed to be transmitted on the basis of whether or not the strength variation exists. However, in the case where the communication status between the vehicle-side device and the mobile device is unstable, or in the case where an apparatus radiating a radio wave such as a cellular phone exists near the mobile device, there may be a case in which it is difficult to keep the strength variation added by the vehicle-side device as is. Hence, in circumstances like this, there may be a case in which the existence of a strength variation cannot be accurately detected on the mobile device side and, hence, it cannot be said that this method has sufficient security capabilities.

Further, in recent years, unauthorized relay devices used for a relay attack have an increased performance and some of newly available devices generate a signal following the strength variation added to a request signal. Hence, it is difficult to prevent a relay attack by only adding a strength variation to a request signal and, hence, there is a problem in that the security is weak.

SUMMARY

The present invention provides a keyless entry apparatus in which a request signal includes a modulated signal and switching between modulation methods is performed at least once, thereby making a mobile device which does not have information about the modulation system and the switching between modulation methods be unable to perform demodulation even when the mobile device receives a request signal and, hence, a relay attack is prevented and security performance is increased.

A keyless entry apparatus includes: a vehicle-side device provided in a vehicle, the device including a vehicle-side transmitter that transmits a request signal and a vehicle-side receiver that receives an answer signal; and a mobile device including a mobile device receiver that receives the request signal and a mobile device transmitter that transmits the answer signal in accordance with the request signal. The vehicle-side device includes at least one modulator that modulates the request signal, the mobile device includes at least one demodulator that demodulates the request signal in accordance with the corresponding at least one modulator, and the request signal includes a signal modulated by the at least one modulator. Switching between modulation methods for the request signal is performed at least one timing.

As described above, since the request signal includes a modulated signal and switching between modulation methods for the request signal is performed at least once, even when the request signal is received by a mobile device which does not have information regarding the modulation system or switching between the modulation methods, the request signal cannot be demodulated. As a result, a relay attack is prevented and security performance is increased.

Switching between modulation methods can be performed, for example, (1) by switching between a plurality of modulators having different modulation systems, (2) by switching between modulation conditions while using single modulator, or (3) by a combination of these.

DESCRIPTION OF THE EXEMPLARY EMBODIMENTS

Hereinafter, a keyless entry apparatus according to an embodiment of the present invention will be described in detail with reference the drawings.

Figure 1:
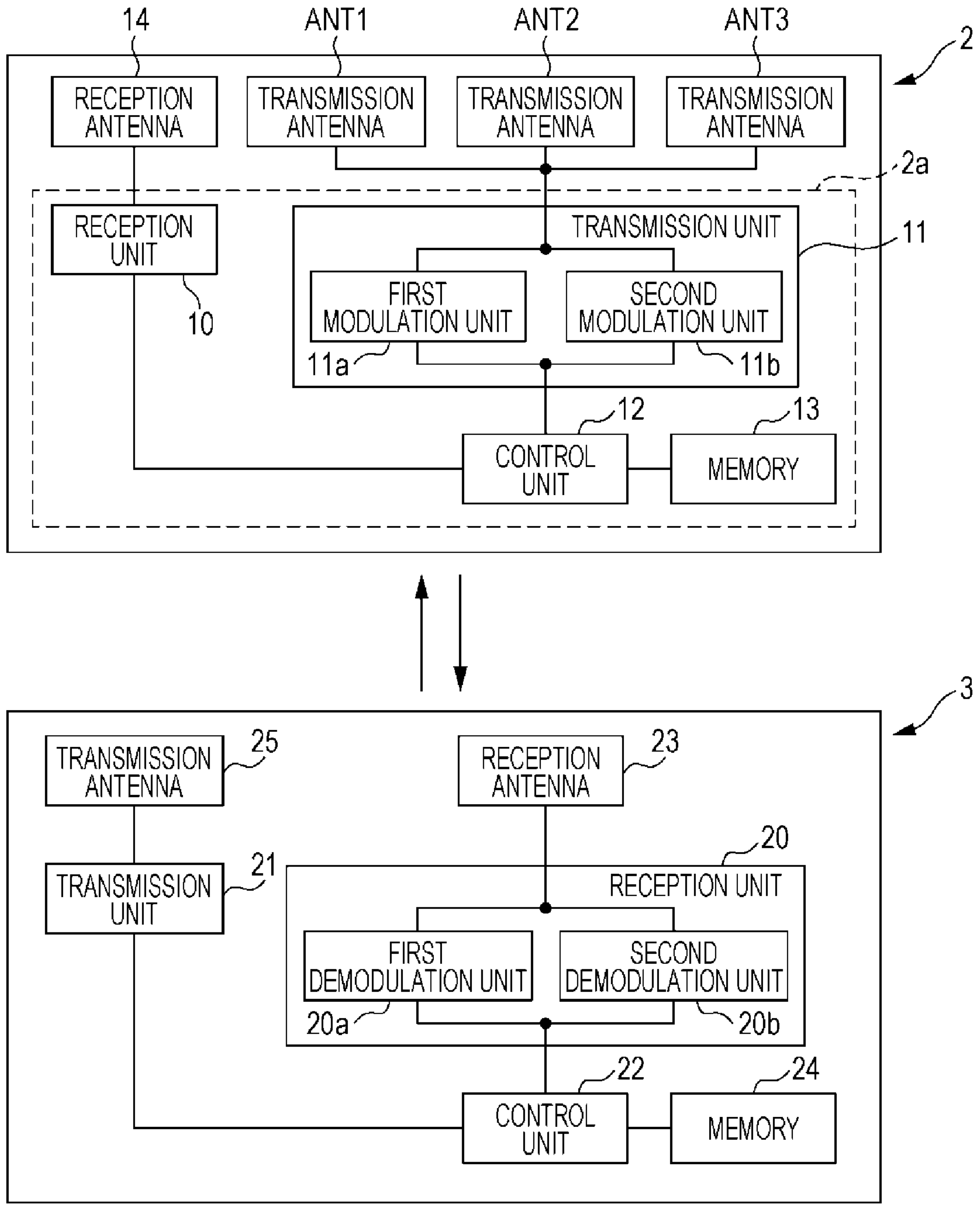
FIG. 1 is a block diagram illustrating the configuration of a keyless entry apparatus according to an embodiment of the present invention.
Figure 2:
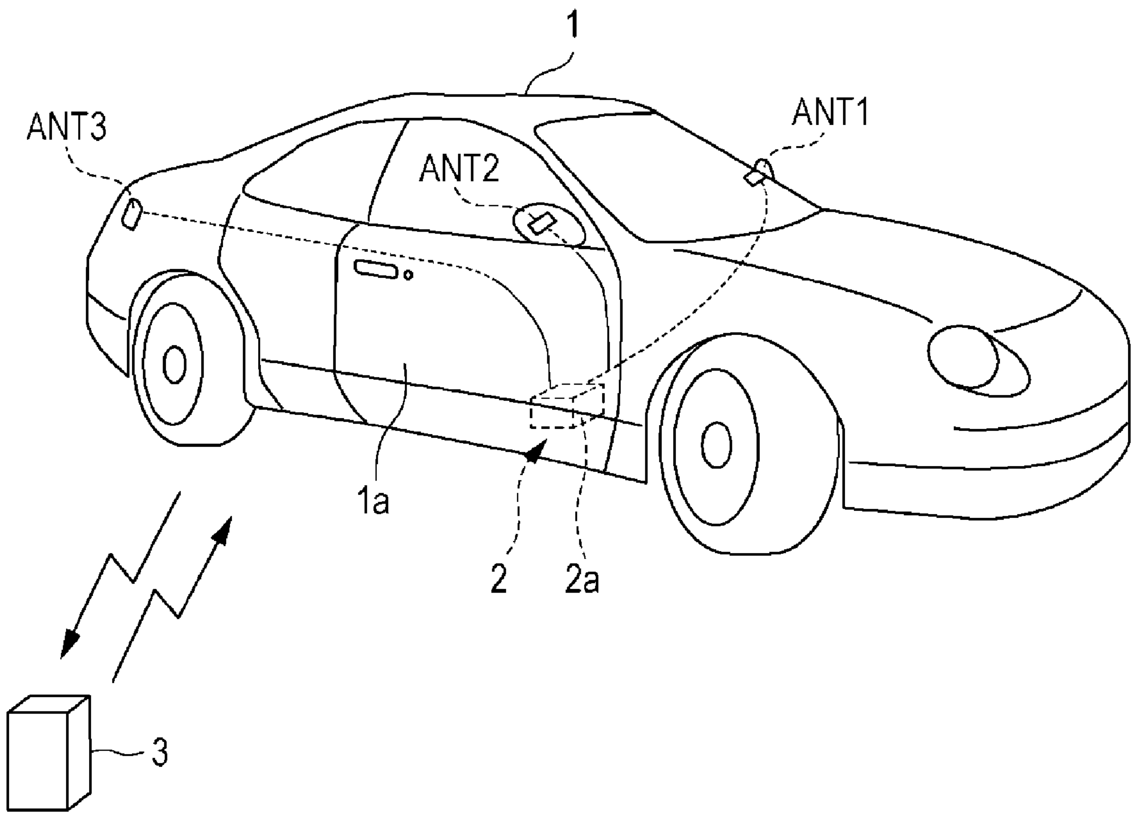
FIG. 2 is a perspective view illustrating the configuration of a vehicle-side device according to the embodiment of the present invention.

FIG. 1 is a block diagram illustrating the configuration of a keyless entry apparatus according to the present embodiment, and FIG. 2 is a perspective view illustrating the configuration of a vehicle-side device according to the present embodiment. In the keyless entry apparatus according to the present embodiment, a vehicle-side device 2 is provided on a vehicle 1 side and performs wireless communication with a mobile device 3 which a user can carry, thereby performing predetermined control of the vehicle 1 such as locking and unlocking of a door 1$a$ and the like.

The vehicle-side device 2 includes an electronic control unit 2*a* arranged within the vehicle 1, a plurality of transmission antennas ANT1 to ANT3, and a reception antenna 14. The electronic control unit 2*a* includes a vehicle-side reception unit 10 (reception unit), a vehicle-side transmission unit 11 (transmission unit), a vehicle-side control unit 12 (control unit), and a memory 13.

The vehicle-side reception unit 10 receives a signal, for example, an answer signal, transmitted from the mobile device 3.

The vehicle-side transmission unit 11 transmits a request signal and the like to the mobile device 3. When a request signal transmitted by the vehicle-side device 2 is received by the mobile device 3, an answer signal is transmitted from the mobile device 3 to the vehicle-side device 2 for authentication between the vehicle-side device 2 and the mobile device 3. When authentication has been performed in the vehicle-side device 2 which received the answer signal, the door 1*a* of the vehicle 1 is unlocked.

The vehicle-side transmission unit 11 includes a first modulation unit 11*a* as first modulator or modulation means and a second modulation unit 11*b* as second modulator or modulation means. A request signal output from the vehicle-side transmission unit 11 to the transmission antennas ANT1 , ANT2, and ANT3 includes, for example, a plurality of time-division-multiplexed signals and each signal (divided request signal) is a signal which is obtained by modulating a signal (carrier wave) generated by the vehicle-side transmission unit 11 at the first modulation unit 11*a* or the second modulation unit 11*b*. For example, the first modulation unit 11*a* outputs an amplitude modulated (OOK) signal, and the second modulation unit 11*b* outputs a phase modulated (PSK) signal. Connection between the transmission antennas ANT1 to ANT3 and the first modulation unit 11*a* or the second modulation unit 11*b* is switched by the vehicle-side control unit 12 at predetermined timings. Note that the timing of switching and the number of times the switching is performed can be freely set.

A modulation method switching signal indicating the timing of switching between the first modulation unit 11*a* and the second modulation unit 11*b* is added to a request signal which is output from the vehicle-side transmission unit 11 to the transmission antennas ANT1, ANT2, and ANT3. The modulation method switching signal is added to a divided request signal transmitted before the timing of switching. For example, referring to FIG. 3, in the case where a request signal is formed of an amplitude modulation signal Sr1 and a phase modulation signal Sr2, a modulation method switching signal indicating the timing at which the amplitude modulation signal Sr1 is switched to the phase modulation signal Sr2 is added to the amplitude modulation signal Sr1 transmitted before the switching.

Here, it is preferable that the modulation system of a signal of the beginning portion of a request signal be a system determined in advance and stored in the memory 13. On the other hand, without determining in advance, a signal indicating the modulation system of a signal of the beginning portion of a request signal may be transmitted in advance to the mobile device 3 side before the transmission of the request signal.

The vehicle-side control unit 12 performs predetermined control of the vehicle 1 such as switching between the first modulation unit 11*a* and the second modulation unit 11*b*, control of the operations of the vehicle-side reception unit 10 and the vehicle-side transmission unit 11, authentication processing based on an answer signal transmitted from the mobile device 3, unlocking of the door 1*a* based on this authentication processing, and the like.

The memory 13 stores an ID specific to a vehicle, IDs of a plurality of mobile devices that can operate a single vehicle, and the like.

The plurality of transmission antennas ANT1 to ANT3 that transmit a signal by using a first frequency are connected to the vehicle-side transmission unit 11. The plurality of transmission antennas ANT1 to ANT3 are provided at various locations of the vehicle 1, for example, a plurality of doors or in the vicinity thereof. Here, the first frequency is preferably a low frequency (LF) in a long wave region, for example, 30-300 kHz, but a very long frequency (VLF) may be also used. The reception antenna 14 for receiving a signal transmitted from the mobile device 3 is connected to the vehicle-side reception unit 10.

Here, the modulation system used for a request signal may be a system other than amplitude modulation and phase modulation. For example, frequency modulation may be performed when a transmission signal from the vehicle-side device 2 and a transmission signal from the mobile device 3 are within frequency ranges that can be distinguished from each other by the two devices. Further, when the number of divided request signals is three or more, it is preferable that the modulation units of the vehicle-side device 2 and the modulation units of the mobile device 3 be provided in accordance with the number of divided request signals, thereby realizing efficient modulation/demodulation processing.

A modulation system in a first divided request signal in a request signal may be arbitrarily set and, for example, the first divided request signal may be either of an amplitude modulation signal and a phase modulation signal.

Further, switching between divided request signals may be performed by changing a modulation condition (for example, the magnitude of an amplitude) rather than switching between modulation systems. In this case, a configuration including only one of the first modulation unit 11*a* and the second modulation unit 11*b* may be employed, where a modulation method switching signal is a signal indicating the timing at which switching between the modulation conditions is performed.

In the above description, a single signal is divided on the basis of time division, and switching between the modulation systems or the modulation conditions is performed, thereby realizing divided request signals. However, instead of this method, signals in which switching between the modulation systems or modulation conditions has been performed may be sequentially output as mutually independent signals.

Further, the request signals may include a signal, which is not modulated.

As illustrated in FIG. 1, the mobile device 3 includes a mobile device reception unit 20 (reception unit), a mobile device transmission unit 21 (transmission unit), a mobile device control unit 22 (control unit), a mobile device reception antenna (reception antenna) 23, a memory 24, and a mobile device transmission antenna (transmission antenna) 25.

The mobile device reception unit 20 receives signals transmitted from the vehicle-side device 2, for example, a request signal and a modulation method switching signal added to the request signal. The mobile device reception unit 20 includes a first demodulation unit 20*a* as first demodulation means and a second demodulation unit 20*b* as second demodulation means. The first demodulation unit 20*a* and the second demodulation unit 20*b* respectively correspond to the first modulation unit 11*a* and the second modulation unit 11*b* of the vehicle-side device 2. In other words, among request signals received by the reception antenna 23, a signal modulated by the first modulation unit 11 a is demodulated in the first demodulation unit 20*a*, and a signal modulated by the second modulation unit 11*b* is demodulated in the second demodulation unit 20*b*. The demodulated signals are output to the mobile device control unit 22. Note that the modulation system in the first divided request signal among the request signals is set and stored in the memory 24 in advance.

The mobile device transmission unit 21 transmits an answer signal corresponding to a request signal and other signals to the vehicle-side device 2.

The mobile device control unit 22 performs control of, for example, the operations of the mobile device reception unit 20 and the mobile device transmission unit 21, determination regarding whether or not the request signals demodulated by the first demodulation unit 20*a* and the second demodulation unit 20*b* are signals conforming to predetermined specifications, and switching between the first demodulation unit 20*a* and the second demodulation unit 20*b* performed so that one of them is connected to the reception antenna 23 in accordance with the modulation method switching signal transmitted from the vehicle-side device 2. When it is determined by the mobile device control unit 22 that the demodulated request signal is a signal conforming to the specifications, which have been defined and stored in the memory 24 in advance, the mobile device transmission unit 21 transmits an answer signal including the determination result to the vehicle-side device 2.

The memory 24 stores, for example, an ID, which has been set in the mobile device 3 and a vehicle-side ID.

The reception antenna 23 is connected to the mobile device reception unit 20. The reception antenna 23 is, for example, a three-axis antenna having directivity characteristics in three mutually orthogonal directions, and receives a first-frequency signal transmitted from the vehicle-side transmission unit 11. The transmission antenna 25 is connected to the mobile device transmission unit 21. The transmission antenna 25 transmits a signal to the vehicle-side device 2 by using a second frequency. Here, the second frequency is, for example, a UHF frequency (300 MHz-3 GHz), higher than the first frequency described above.

In the description above, switching between the modulation systems or the modulation conditions is performed on the basis of a modulation method switching signal added to a request signal. However, instead of this, without using a modulation method switching signal, by setting in advance information about timing at which switching between the modulation methods is performed and storing the information in the memory 13 of the vehicle-side device 2 and the memory 24 of the mobile device 3, switching between the modulation/demodulation methods is performed on the basis of this timing information. This timing information includes, in addition to the switching timing, the modulation systems switched between and the sequence thereof, and the number of times the switching is performed.

Figure 3:
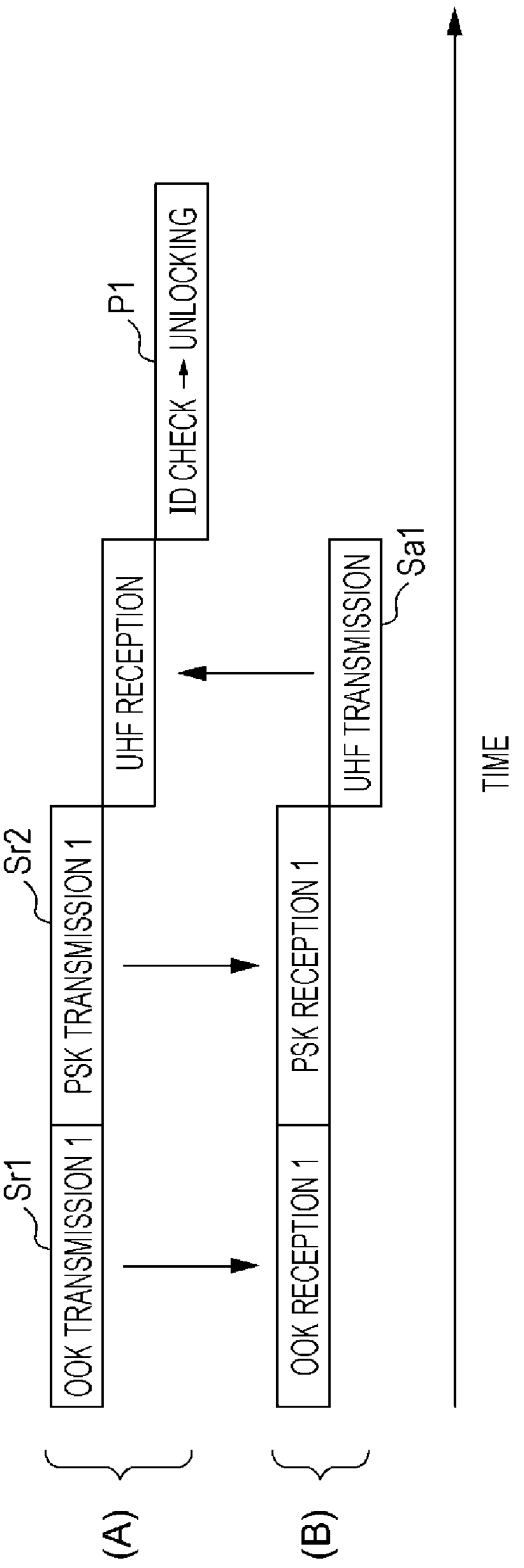
FIG. 3 is a timing chart illustrating the timings of the transmission and reception of a request signal and an answer signal in the embodiment of the present invention.

Next, referring to FIG. 3, the flow of communication between the vehicle-side device 2 and the mobile device 3 will be described. FIG. 3 is a timing chart illustrating the timings of the transmission and reception of a request signal and an answer signal in the present embodiment, where (A) illustrates the reception and processing timings of a signal on the vehicle-side device 2 side and (B) illustrates the transmission and reception timings of a signal on the mobile device 3 side.

Request signals are periodically transmitted from the transmission antennas ANT1, ANT2, and ANT3. ID information set in the vehicle-side device 2 has been added to the request signals. In the example illustrated in FIG. 3 (A), the amplitude modulation (OOK) signal Sr1 and the phase modulation (PSK) signal Sr2 are sequentially transmitted to the mobile device 3 side as time division divided request signals. A modulation method switching signal indicating the timing of switching to the phase modulation signal Sr2 has been added to the amplitude modulation signal Sr1.

In the mobile device 3, upon receipt of the amplitude modulation signal Sr1, the signal is demodulated by the first demodulation unit 20*a* in accordance with a modulation system for the first divided request signal stored in the memory 24 in advance. Then, the mobile device control unit 22 switches the first demodulation unit 20*a* to the second demodulation unit 20*b* in accordance with timing indicated by the modulation method switching signal added to the amplitude modulation signal Sr1, and makes the second demodulation unit 20*b* demodulate the received phase modulation signal Sr2. Further, the mobile device control unit 22 determines whether or not the request signals demodulated by the first demodulation unit 20*a* and the second demodulation unit 20*b* are signals conforming to the predetermined specifications. When it is determined by the mobile device control unit 22 that the demodulated signals are signals conforming to the predetermined specifications, the mobile device transmission unit 21 transmits an answer signal Sa1 containing the determination result to the vehicle-side device 2 corresponding to the ID added to the request signal. The ID information set in the mobile device 3 is added to the answer signal Sa1.

In the vehicle-side device 2, which has received the answer signal Sa1, the vehicle-side control unit 12 compares the ID of the vehicle-side device 2 with the received ID of the mobile device 3 and performs predetermined authentication processing. The vehicle-side control unit 12, when authentication is successful as a result of the authentication processing, performs unlocking P1 of the door 1*a* of the vehicle 1. Here, the authentication processing includes determining whether or not the answer signal Sa1 transmitted from the mobile device 3 includes an appropriate determination result. In the case where an appropriate determination result is not included, authentication is not performed.

According to the embodiment described above, the following advantageous effects are obtained as a result of the configuration described above.

(1) Since a request signal includes a modulated signal and switching between the modulation methods of the request signal is performed at least once, even when the request signal is received by a mobile device that does not have information regarding the modulation system or the switching between the modulation methods, the mobile device cannot demodulate the request signal. As a result, a relay attack is suppressed and, hence, security performance is increased.

(2) With a simple configuration, security performance can be increased, since switching between the modulation methods of a request signal can be performed by only switching between the modulation units and switching between the demodulation units.

(3) By transmitting a modulation method switching signal together with a request signal, synchronization with demodulation means can be reliably realized.

While the present invention has been described with reference to the embodiments described above, the present invention is not limited to the embodiments described above. Improvements and modifications within the objects of the improvement or the scope of the present invention are possible.

As described above, in the keyless entry apparatus according to the present invention, a request signal includes a modulated signal, and switching between the modulation methods of the request signal is performed at least once and, hence, when the request signal is received by a mobile device which does not have information regarding the modulation system or switching between the modulation methods, the request signal cannot be demodulated. As a result, a relay attack is prevented and security performance is increased.

What is claimed is:

1. A keyless entry apparatus comprising:

a vehicle-side device provided in a vehicle, the device including a vehicle-side transmitter that transmits a request signal and a vehicle-side receiver that receives an answer signal; and a mobile device including a mobile device receiver that receives the request signal and a mobile device transmitter that transmits the answer signal in accordance with the request signal, wherein the vehicle-side device includes at least one modulator that modulates the request signal, wherein the mobile device includes at least one demodulator that demodulates the request signal in accordance with the corresponding at least one modulator, and wherein the request signal includes a signal modulated by the at least one modulator, and wherein switching between modulation methods for the request signal is performed at at least one timing, wherein the vehicle-side device transmits a modulation method switching signal indicating the timing by adding the modulation method switching signal to the request signal, wherein the switching between the modulation methods for the request signal is performed at a timing instructed by the modulation method switching signal, wherein the modulator includes at least first modulator and second modulator, wherein the demodulator includes at least first demodulator and second demodulator respectively corresponding to the first modulator and the second modulator, wherein the request signal is time-divided into a plurality of divided request signals, and includes, as the divided signals, a first request signal modulated by the first modulator and a second request signal modulated by the second demodulator, and wherein the modulation method switching signal is added to either one of the first request signal and the second request signal, wherein the vehicle-side device transmits a modulation method switching signal indicating the timing by adding the modulation method switching signal to the request signal, and wherein the switching between the modulation methods for the request signal is performed at a timing instructed by the modulation method switching signal.

2. The keyless entry apparatus according to claim 1, wherein the at least one modulator comprises a plurality of modulators and the at least one demodulator comprises a plurality of demodulators, and wherein the switching between the modulation methods for the request signal is performed by switching between the plurality of modulators at the at least one timing.

3. The keyless entry apparatus according to claim 1, wherein a modulation system of the first modulator is amplitude modulation and a modulation system of the second modulator is phase modulation, and wherein a demodulation system of the first demodulator is amplitude modulation and a demodulation system of the second demodulator is phase modulation.

4. The keyless entry apparatus according to claim 1, wherein the switching between the modulation methods for the request signal is performed in one of the modulator by changing a modulation condition of the signal at the at least one timing.

5. The keyless entry apparatus according to claim 1, wherein the at least one timing is stored in the vehicle-side device and the mobile device in advance.

* * * * *